3,119,857
PROCESS FOR THE MANUFACTURE OF ORGANO-BORON HALIDES AND ESTERS
John Yates, Weston, Runcorn, and Raymond S. Airs, Hooton, England, assignors to Shell Oil Company, a corporation of Delaware
No Drawing. Filed May 9, 1956, Ser. No. 583,620
Claims priority, application Great Britain May 9, 1955
4 Claims. (Cl. 260—462)

This invention provides a novel process for the preparation of organoboron compounds, which comprises reacting an organo-alkali metal with a boron trihalide or an ester of boric acid in an inert liquid reaction medium, with cooling if necessary, to produce the corresponding organoboron halide or organoboric acid ester.

In an extension of the above process, the organoboron halide or organoboric acid ester thereby produced is reacted with water to produce the corresponding organoboric acid.

The organoboron compounds produced by the above processes have one or two organo groups attached to the boron atom, each by a carbon-to-boron linkage. The boron atom accordingly is attached respectively to two halogen atoms or ester or hydroxyl groups, or to one of said atoms or groups.

The organo-alkali metal compound used in the process of the invention is preferably a lithium, sodium or potassium compound, the organo group being attached to the metal by a carbon-to-metal linkage. The organo group may be an acyclic or cyclic hydrocarbon group which may be saturated or unsaturated. Preferably, the hydrocarbon group is an aromatic hydrocarbon group, for example, a phenyl group. The organo group may also be a heterocyclic group, for example, a furyl or thiophene group. The organo group may carry one or more substituent groups which are inert with respect to the alkali metal substituent, for example, hydrocarbon, nitro, etherified hydroxyl, alkali metalloxy and trifluoromethyl groups.

Examples of organo-alkali metal compounds which may be used in the process of the invention are butyllithium, ethylsodium, alkali metal alkyne derivatives, benzylsodium, benzylpotassium, sodium triphenylmethyl, o-aminophenyllithium, p-nitrophenyllithium, dibenzfuryllithium and thionaphthenyllithium. Phenyllithium and phenylsodium are particularly suitable compounds for use in the present process.

The organo-alkali metal may be obtained by any process known in the art for preparing these compounds. A convenient method is to react a halo-hydrocarbon, preferably a chloro- or bromo-derivative, with two equivalent amounts of the alkali metal, preferably in finely divided state or in thin strips, in an indifferent solvent. In this method of preparation, the halohydrocarbon may also carry a substituent, for example, a hydroxyl group which will react with the alkali metal provided an additional proportion of alkali metal is used. Anhydrous ether, ligroin, toluene and xylene are suitable solvents for this purpose. The organo-alkali metal thereby produced may be used in the process of the invention without being isolated.

Organo-alkali metal compounds may also be prepared by reacting an alkylalkali metal, for example, butyllithium or amylsodium, with an aromatic hydrocarbon or a heterocyclic compound which may carry one or more substituents. With an etherified hydroxyl or trifluoromethyl substituent group, metallation occurs predominantly in the nucleus in the ortho-position to the substituent group. With a methyl mercapto group as a nuclear substituent, however, metallation occurs in the methyl portion of this group and not in the nucleus. Metallation also occurs in the methyl substituent groups of methylpyridines. The aromatic hydrocarbon or heterocyclic compound may also carry a nuclear halogen substituent, in which case metallation occurs in the position of this halogen substituent in the ring. The halogenated aromatic or heterocyclic compound may also carry a hydroxy substituent group, for example, p-bromophenol, provided an additional equivalent of alkylalkali metal is used to react with this group.

The organo-alkali metal compound is reacted in the process of the invention with a boron trihalide. Boron trichloride or boron trifluoride are preferred for this purpose as they are commercially available substances. They may be used either as such, or in the form an addition compound with an ether, for example, with the ether used as the reaction medium. Alternatively, the organo-alkali metal compound is reacted with a tri-ester of boric acid. This ester may be derived from an alcohol or from a phenol. Advantageously it is derived from an aliphatic alcohol containing from 1 to 5 carbon atoms in the molecule, particularly methyl alcohol, as such alcohols are readily separated in any subsequent hydrolysis of the organoboric acid ester to the organoboric acid.

The reaction between the organoalkali metal and the boron tri-halide or boric acid ester may be effected in various ways. While it is theoretically possible to contact the liquid or vaporized boron compound with the solid organoalkali metal compound, for example, in finely divided form, it is unlikely that such a reaction could be performed in a controllable manner. It is therefore preferable to effect the reaction in a liquid medium which may be a solvent for one or both reactants. The liquid medium employed should be one which remains liquid at the low temperature at which the reaction is generally effected and should, of course, be anhydrous. Suitable reaction media are, for example, diethyl ether, ligroin, toluene or xylene. When a volatile boron compound is used as the one reactant, the vapour may be passed gradually into the solution or suspension of the organoalkali metal in the inert liquid. It is, however, in general advantageous to dissolve the volatile reactant in an inert liquid and add the resulting solution gradually to the solution on suspension of the organoalkali metal in an inert liquid.

The temperature at which the reaction between the organoalkali metal and the boron trihalide or boric acid ester is effected depends to some extent on the nature of the boron-containing reactant and on the liquid reaction medium employed. In general, it is desirable to operate at temperatures below 0° C. if appreciable yields of the desired products are to be obtained. Thus when an ester of boric acid is used in an ethereal reaction, medium, reaction temperatures of below —20° C. and preferably of about —60° C. are desirable. When, however, a hydrocarbon is used as the reaction medium instead of an ether, reaction temperatures up to about +70° C. may be employed without appreciable reduction in yield. Reaction temperatures of —20° C. and below, for example, —60° C. are also preferable when boron trihalides are used as reactants though temperatures up to about +12° C. can be used with boron trichloride. If desired, increased operating pressures may be employed, particularly when boron trifluoride is used.

The reaction between the organo-alkali metal and the boron trihalide or boric acid ester should, of course, be carried out in the absence of any other substances which will react with one or both of these reactants, for example, hydroxylic compounds such as water or alcohols.

The organoboron halide or ester of the organoboron acid obtained as the reaction product of the process of the invention may be isolated by any suitable method. For example, the reaction mixture obtained when organoalkali metals are reacted with boron trihalides may be decanted and/or filtered, under anhydrous conditions where necessary, to remove precipitated by-products such as alkali metal halides. The solvent and volatile impurities can then be removed by distillation and the residue purified by distillation, if necessary under reduced pressure, or by recrystallization from a suitable solvent. This method is not in general suitable where a boric acid ester has been used as a reactant since the product appears to be present as an insoluble complex, probably of the type $Na^+[(PhB(OMe)_3]^-$.

Alternatively, and according to an extension of the process of the invention, the reaction product may be hydrolyzed to the corresponding organo boric acid by reaction with water. Where an ester of boric acid has been used as a reactant in the process of the invention, hydrolysis is preferably effected with an aqueous solution of a mineral acid to neutralize the alkali formed. Suitably, the reaction mixture is agitated with a dilute aqueous mineral acid solution, the solvent layer containing the organoboric acid separated and the solvent and any low boiling impurities, such as lower aliphatic alcohols, removed by distillation. Steam distillation may be employed to remove higher boiling impurities, such as higher alcohols, when boric acid esters of such alcohols have been used as reactants. The organoboric acid may be filtered off from the distillation residue or may be extracted from it by means of ether. Advantageously, the distillation residue is first made alkaline and then extracted with ether or other solvent to remove non-acidic impurities and the purified organoboric acid then liberated by acidifying the alkaline solution. The organoboric acid may be recrystallized from benzene, aqueous alcohol or other suitable solvent. Owing to the readiness with which organoboric acids lose water to form anhydrides, it is preferable to use water or an aqueous organic solvent such as aqueous alcohol for recrystallization.

The organoboron compounds produced by the process of the invention are chiefly organoboronic compounds in which the boron atom is attached to one organic radical. Small quantities of organoborinic compounds in which the boron atom is attached to two organic radicals are sometimes formed simultaneously and may be separated from the boronic compounds by fractional distillation, crystallization or other suitable means. The mixtures of organoboron acids containing one or two organic groups attached to the boron atom are conveniently separated by washing the mixture with light petroleum (for example, of 60–80° C. or 80–100° C. boiling range) in which the latter are more soluble. In some cases, it is possible to convert the borinic compound into the boronic compound. Thus, diphenylborinic acid may be converted into phenylboronic acid by treatment with a halogen such as chlorine or bromine in the presence of water, or with hydrogen peroxide, according to the method of N. N. Mel'nikov given in Chemical Abstracts, 1936, volume 30, page 5571.

The following examples illustrate the process of the invention, the parts by weight (p.b.w.) bearing the same relation to the parts by volume (p.b.v.) as the kilogram bears to the litre.

EXAMPLE I

*Phenylboronic Acid*

A solution of phenyllithium was prepared from bromobenzene (78.5 p.b.w.; 0.5 mol.) and lithium strips (8.6 p.b.w.; 1.25 atoms) in dry ether (375 p.b.v.) under an atmosphere of nitrogen. The solution was decanted from excess lithium and added dropwise with stirring to a solution of tri-n-butyl borate (116 p.b.w.; 0.5 mol.) in dry ether (200 p.b.v.), the reaction temperature being maintained at between −60° C. and −65° C. by cooling in a mixture of isopropyl alcohol and solid carbon dioxide. The reaction mixture was allowed to warm to room temperature by standing overnight. The resulting solution was hydrolyzed, by adding it dropwise to aqueous sulphuric acid (300 p.b.v.) containing 10 percent by weight of $H_2SO_4$, which was stirred vigorously and cooled in an ice/salt bath.

The ether layer was separated and combined with the ether extracts obtained by extracting the aqueous layer twice using 100 p.b.v. of ether each time. The ether was removed by distillation, leaving a butanol solution which was made alkaline by adding potassium hydroxide (65 p.b.w.) in water (350 p.b.v.). The butanol was removed by steam distillation under a pressure of 28 millimetres of mercury and the aqueous solution was filtered from a gummy residue (2.5 p.b.w.) and acidified with aqueous sulphuric acid containing 10% by weight of $H_2SO_4$. The acid solution was heated to boiling, filtered hot and the residue extracted with boiling water (2 x 10 p.b.v.).

The filtrates were combined and cooled and the precipitated solid was collected and crystallized from a mixture of benzene (150 p.b.v.) and light petroleum (B.P. 40–60° C.; 50 p.b.v.) as a white powder (26.4 p.b.w.; 0.22 mol.; 43% yield), M.P. 215–216° C. (with oil bath preheated to 200° C.). This was phenylboronic acid.

EXAMPLE II

*Phenylboronic Acid and Diphenylborinic Acid*

A solution of phenyllithium prepared from bromobenzene (314 p.b.w.; 2.0 mol.) and lithium (30.8 p.b.w.; 4.4 atoms) in dry ether (1400 p.b.v.) was decanted from excess lithium and added dropwise to a stirred solution of trimethyl borate (208 p.b.w.; 2.0 mol.) in dry ether (400 p.b.v.), the reaction temperature being maintained below −65° C. by cooling in a mixture of isopropyl alcohol and solid carbon dioxide. The clear solution was allowed to warm to room temperature overnight. It was then added slowly to aqueous sulphuric acid (1200 p.b.v.) containing 10 percent by weight of $H_2SO_4$, with stirring and cooling in ice.

The ethereal layer was separated and the aqueous layer was extracted three times with ether, using 200 p.b.v. each time. The combined ether solutions were distilled to dryness from a boiling water bath and the off-white residue was crystallized from water and then from a mixture of equal parts by volume of benzene and light petroleum (B.P. 40–60° C.) giving colourless needles of phenylboronic acid (20.5 p.b.w.; 0.17 mol.; 8.5% yield), M.P. and mixed M.P. 214–216° C.

The mother liquor was distilled to remove the solvent, a black oily residue being obtained. (This residue (86.6 p.b.w.) was distilled under reduced pressure and gave an initial fraction consisting of water (about 25 p.b.w.) and a fraction which distilled at 88° C. under a pressure of 1.0 millimetre of mercury and was proved to be diphenyl.)

The distillation residue containing diphenylborinic acid was dissolved in an aqueous ethanol solution containing 50 percent by volume of ethanol and a solution of monoethanol-amine (15 p.b.v.) in 15 p.b.v. of the aqueous ethanol solution was added. The mixture, from which a precipitate began to separate, was stirred at room temperature for 30 minutes, cooled in ice and filtered. The residue was dissolved in benzene, reprecipitated by adding light petroleum (B.P. 70–95° C.) and finally crystallized from aqueous ethanol containing 30 percent by volume of ethanol. The product was dried at 60° C. under 15 millimetres pressure of mercury for 2 hours, giving 2-aminoethyl diphenylborinate (6.3 p.b.w.) as off-white platelets, M.P. 189° C. *Analysis.*—Found: N, 6.3%. Calculated for $C_{14}H_{16}ONB$: N, 6.2%.

EXAMPLE III

*Phenylboronic Acid*

Phenylsodium was prepared as described by Gilman and Jones (J.A.C.S., 1940, 62, 1514) from chlorobenzene (50.6 p.b.w., 0.45 mol.) and sodium (23 p.b.w.; 1.0 atom)

in toluene (300 p.b.v.). The resulting mixture was stirred and cooled to −30° C. during the dropwise addition of a slurry of methyl borate (52 p.b.w.; 0.5 mol.) in benzene (250 p.b.v.) also cooled to −30° C. The mixture was stirred and allowed to warm to room temperature. After 3 hours, ethanol (250 p.b.v.) was added, followed by water (500 p.b.v.). The aqueous layer was separated and stripped under reduced pressure until the volume was about 300 p.b.v. The solution was made up to 500 p.b.v. with distilled water and acidified (to Congo red indicator) with concentrated hydrochloric acid. The mixture was heated to boiling and filtered from a dark brown oil. Extraction of the cooled filtrate 5 times with ether (50 p.b.v. each time) followed by evaporation of the combined extracts gave a light brown residue. This was crystallized from water (100 p.b.v.) using decolorizing charcoal. Phenylboronic acid (5.5 p.b.w.; 10% yield) was obtained, M.P. 215–216° C., when immersed in the bath preheated to 214° C.

EXAMPLE IV

Phenylboronic Acid

Sodium (27.3 p.b.w.; 1.19 mol.) was converted to a dispersion (particle size 10–25 microns) in dry toluene (96 p.b.w.) using 1% by weight oleic acid as dispersing agent. The mixture was cooled to 25–30° C. and chlorobenzene (58 p.b.w.; 0.52 mol.) in toluene (50 p.b.w.) was gradually added. The solution was then cooled to −60° C. and a solution of methyl borate (60 p.b.w.; 0.58 mole) in dry ether (160 p.b.v.) added with stirring. After warming to room temperature, residual sodium was destroyed by adding industrial methylated spirit (50 p.b.v.) at below 10° C. Hydrolysis was effected by adding 300 p.b.v. of 7% aqueous sulphuric acid solution and the ether layer separated. The aqueous solution was twice washed with 150 p.b.v. of ether and the combined ether/toluene solutions were distilled to remove ether and most of the toluene. Sodium hydroxide (30 p.b.w.) in water (150 p.b.v.) was added to the orange brown liquid residue and the mixture distilled to remove residual toluene. The mixture was cooled, extracted with ether to remove neutral products and acidified with hydrochloric acid. The mixture was extracted with ether (3 x 100 p.b.v.), the extract evaporated and the viscous brown residue washed with light petroleum to remove any diphenylborinic acid. A light brown powder (13.2 p.b.w.) remained, representing a yield of 21.5% on the chlorobenzene taken. Two recrystallizations from water gave a product, M.P. 208–211° C.; acid value, 461 milligrams of potassium hydroxide per gram (theory 460); boron content, 8.8%; theory, 8.5%.

EXAMPLE V

Phenylboronic Acid

Phenylsodium was prepared by reacting sodium (27.3 p.b.w.; 1.19 atoms) with chlorobenzene (58.0 p.b.w.; 0.52 mol.) as described in Example IV and was then added gradually to a stirred solution of boron trichloride (72 p.b.w.; 0.61 mol.) in dry toluene (60 p.b.w.) the temperature of the reaction mixture being kept below −20° C. After addition was complete, industrial methylated spirit (150 p.b.v.) was added to destroy excess sodium and boron trichloride, the temperature being kept below 15° C. The product was then hydrolysed by adding 300 p.b.v. of 20% sulphuric acid and the two layers formed were separated. The aqueous layer was twice washed with 150 p.b.v. of ether and the washings added to the organic layer. The combined layers were extracted 3 times with 50 p.b.v. of 20% sodium hydroxide solution. The combined alkaline extracts were acidified with sulphuric acid, extracted with ether (3 x 100 p.b.v.) and the extracts evaporated to give a yellow solid. Washing this yellow solid with light petroleum (2 x 50 p.b.v.) removed the colour to give phenylboronic acid as a white powder (6.7 p.b.w.; 10.9%), M.P. 204°–206° C.

A further quantity of material (3.3 p.b.w.; 5.4%) was isolated from the light petroleum after standing overnight.

EXAMPLE VI

Phenylthiomethylboronic Acid Ph.S.CH$_2$B(OH)$_2$

Butyl lithium was prepared from butyl bromide (101.5 p.b.w.; 0.75 mol.) and lithium (10.5 p.b.w.; 1.5 atoms) in dry ether (500 p.b.v.) and methylphenyl sulphide (62 p.b.w.; 0.5 mol.) in dry ether (150 p.b.v.) was then added and the mixture refluxed for 15 hours The mixture was then cooled to 0° C. and filtered through glass wool into a stirred solution of methyl borate (52 p.b.w.; 0.5 mol.) in dry ether (150 p.b.v.) cooled to −40° to −50° C. After warming to room temperature, the mixture was acidified with 3 N hydrochloric acid and the ether layer separated and washed four times with 3 N sodium hydroxide solution, using 250 p.b.v. each time. The combined alkaline washings were acidified with concentrated hydrochloric acid. Extraction three times with ether (250 p.b.v. each time) and evaporation of the extract gave an orange oil from which a white solid separated on cooling. This solid was filtered off and recrystallized from water giving white plates of phenyl thiomethylboronic acid (11 p.b.w.), M.P. 110° C. It had an acid value of 328 milligrams of potassium hydroxide per gram; theoretical value 334.

EXAMPLE VII

2:5-Dimethoxyphenylboronic Acid

Hydroquinol dimethyl ether (69 p.b.w.) in anhydrous ether (500 p.b.v.) was metallated with butyl lithium (0.5 mol.) in anhydrous ether (500 p.b.v.). After 60 hours at room temperature the reaction mixture was added to a solution of methyl borate (52 p.b.w.; 0.5 mol.) in anhydrous ether (400 p.b.v.) at −40° C. with stirring. After warming to room temperature the mixture was acidified with a mixture of concentrated hydrochloric acid (100 p.b.v.) and water (200 p.b.v.). The ether layer was separated and the aqueous layer was washed twice with 250 p.b.v. of ether. The combined ether solutions were extracted with a solution of potassium hydroxide (56 p.b.w.) in water (300 p.b.v.). Acidification of the aqueous extract with hydrochloric acid was followed by extraction three times with ether using 100 p.b.v. for each extraction. The residue obtained by evaporation of the ether was crystalized from boiling water giving white needles (8 p.b.w.) of 2:5 - dimethoxyphenylboronic acid, M.P. 95°–96° C. Found: C, 52.9%; H, 6.2%. C$_8$H$_{11}$O$_4$B requires C, 52.8%; H, 6.1%. Acid value, 308 milligrams of potassium hydroxide per gram; theoretical value, 313.

An insoluble dark-red oil remained.

2:6-dimethoxyphenylboronic acid was prepared in a similar way from the dimethyl ether of resorcinol, 4 p.b.w. of white needles, M.P. 102° C. being obtained. Found: C, 51.8%; H, 6.2%. C$_8$H$_{11}$O$_4$B requires C, 52.8%; H, 6.1%. A red insoluble oil was again obtained.

EXAMPLE VIII

Benzfuryl-2-Boronic Acid

Butyl lithium was prepared from butyl bromide (101.5 p.b.w.; 0.75 mol.) and lithium (10.5 p.b.w.; 1.5 atoms) in dry ether (500 p.b.v.) and benzofuran (59 p.b.w.; 0.5 mol.) in dry ether (150 p.b.v.) was added dropwise. The mixture was refluxed for two hours and then added to a stirred solution of methyl borate (52 p.b.w.; 0.5 mol.) in dry ether (250 p.b.v.) cooled at −60° C. After warming to room temperature overnight, the mixture was hydrolysed with 3 N sulphuric acid (300 p.b.v.). The ether layer was separated and washed three times with 3 N sodium hydroxide solution using, respectively, 250, 150 and 100 p.b.v., and adding sufficient water each time to give two clear liquid phases. The combined alkaline solutions were acidified with concentrated hydrochloric acid and cooled to 0° C. when the separated oil solidified. The solid was filtered off (78 p.b.w.) and recrystallized from water twice, being obtained finally as colourless crystals (37.5 p.b.w.), M.P. 135° C. This was benzfuryl-2-boronic acid. It had an acid value of 343 milligrams of potassium hydroxide per gram; theoretical value, 346.

EXAMPLE IX

*Dibenzfuryl-4-Boronic Acid*

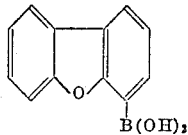

A solution of n-butyl lithium from n-butyl bromide (68.5 p.b.w.; 0.5 mol.) and lithium (7.0 p.b.w.; 1.0 g. atom) in dry ether (250 p.b.v.) was added to a stirred solution of dibenzofuran (84 p.b.w.; 0.5 mol.) in dry ether (650 p.b.w.). The mixture was refluxed for four hours, cooled and filtered through glass-wool into a solution of methyl borate (52 p.b.w.; 0.5 mol.) in dry ether (250 p.b.v.); cooled in a mixture of solid carbon dioxide and light petroleum (B.P. 100–120° C.) at −65° C. The internal temperature was maintained below −30° C. When the addition was completed the mixture was stirred for 30 minutes, warmed to 0–5° C. and hydrolysed by the addition of concentrated sulphuric acid (50 p.b.v.) in water (1000 p.b.v.). The ether layer was separated and the aqueous layer was twice washed with 250 p.b.v. of ether. The combined ether solutions were washed four times with 250 p.b.v. of a 2 N solution of sodium hydroxide and the extracts were stirred and acidified to Congo red with concentrated hydrochloric acid. The solid which separated was collected and crystallized from benzene giving 24.5 p.b.w. of dibenzfuryl-boronic acid, M.P. 255° C.–258° C. It had an acid value of 266 milligrams of potassium hydroxide per gram; theoretical value, 265. Unchanged dibenzofuran (8 p.b.w.) was obtained by evaporation of the alkali-insoluble ether fraction.

EXAMPLE X

*Dibenzthienyl-4-Boronic Acid*

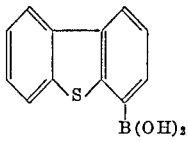

Butyl lithium was prepared in anhydrous ethereal solution (300 p.b.v.) from lithium (8.6 p.b.w.; 1.25 g. atom) and n-butyl bromide (68.5 p.b.w.; 0.5 mol). The solution was filtered through glass wool into a stirred solution of dibenzothiophene (92.0 p.b.w.; 0.5 mol.) in dry ether (1000 p.b.v.). The mixture was refluxed for 18 hours, cooled and added with stirring to a solution of methyl borate (52 p.b.w.; 0.5 mol.) in ether (100 p.b.v.) cooled to −60° C. The yellow mixture was allowed to warm to room temperature overnight and acidified with concentrated sulphuric acid (50 p.b.v.) in water (500 p.b.v.). The ether layer was separated and the aqueous solution was twice extracted with 250 p.b.v. of ether. The combined ethereal solutions were washed with water (200 p.b.v.) and extracted with 10% sodium hydroxide solution (4 x 200 ml.). Acidification with concentrated hydrochloric acid gave a white precipitate which was collected and purified by dissolving in 10% sodium hydroxide solution at room temperature and reacidifying, three times. The final precipitate was filtered off, washed with distilled water and dried under an infra-red lamp. Dibenzthienyl-1-boronic acid was obtained as white product (4.5 p.b.w.), melting point above 360° C. It has an acid value of 248 milligrams of potassium hydroxide per gram; (theoretical value, 246) with a tendency to sublime at 205° C./0.05 mm. Unchanged dibenzothiophene (67.7 p.b.w.) was recovered from the ether solution, M.P. 97.5° C., after crystallization from 90% aqueous I.P.A.

EXAMPLE XI

*Thionaphthenyl-2-Boronic Acid*

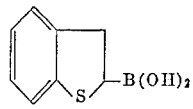

Thionaphthene was metallated with butyl lithium in dry ether. Reaction with methyl borate in ether at −40° C., followed by hydrolysis, gave the thionaphthenyl-2-boronic acid, M.P. 259°–260° C. Found: S, 16.6%. $C_8H_7O_2SB$ requires S, 18.0%. Acid value, 299 milligrams of potassium hydroxide per gram; theoretical value, 315.

The organoboron compounds produced by the process of the invention have use as intermediates and lubricant additives. In particular, the organoboron acids and their salts and esters are active in controlling the growth of plants, particularly of dicotyledonous plants.

We claim as our invention:

1. A method of preparing hydrocarbon substituted boron compounds selected from the group consisting of
   aryl substituted boron halides, aryl substituted boron compounds of formula $R_nB(OR')_{3-n}$, where R is an aryl radical, R' is an alkyl radical and n is an integer from 1 to 2, and alkyl substituted boron compounds of formula $R_nB(OR)_{3-n}$, where R is an alkyl radical and n is an integer from 1 to 2,
which comprises
   bringing together under substantially anhydrous conditions in solution in an inert liquid solvent at a temperature below about 0° C.,
a member selected from the group consisting of
   the boron trihalides and trialkyl borates in which each alkyl group has from 1 to 5 carbon atoms
and a hydrocarbon-alkali metal compound of the formula RNa where R is selected from the group consisting of aryl and alkyl radicals.

2. A method of preparing aryl substituted boron compounds of the formula $R_nB(OR')_{3-n}$, where R is an aryl radical, R' is an alkyl radical, and n is an integer from 1 to 2 which comprises reacting a compound of the formula RNa where R is an aryl radical with a trialkyl borate in an inert hydrocarbon solvent at about room temperature.

3. A method of preparing alkyl substituted boron compounds of the formula $R_nB(OR)_{3-n}$, where R is an alkyl radical and n is an integer from 1 to 2 which comprises reacting a compound of the formula RNa where R is an alkyl radical with a trialkyl borate in an inert hydrocarbon solvent at about room temperature.

4. A process for preparing phenyl boron dichloride comprising mixing phenyl sodium with boron trichloride in a hydrocarbon solvent at a temperature not greater than about 0° C. and thereafter adjusting the reaction vessel temperature to above 0° C. to produce sodium chloride and phenyl boron dichloride.

References Cited in the file of this patent

FOREIGN PATENTS 705,719   Great Britain _____ Mar. 17, 1954

OTHER REFERENCES

Michaelis: Berichte 13:58–61 (1880).
Michaelis: Berichte 15:180–185 (1882).
Wittig et al.: Chem. Abstracts, vol. 46, p. 6607 (1952).
Torssel: Acta Chem. Scand., vol. 8, pages 1779–86 (1954).
Parsons et al.: J. Am. Chem. Soc., vol. 76, page 1710 (1954).
Brindley et al.: J. Chem. Soc. (London), 1955, pages 2956–8.
Mikhailov et al.: Chem. Abstracts, vol. 49, p. 13142 (1955); abstracted translation of Mikhailov et al., Doklady Akad. Nauk SSSR 98, 791–4 (1954).